United States Patent [19]

Banks

[11] 4,287,543
[45] Sep. 1, 1981

[54] TAPE HEAD MOUNT

[75] Inventor: David Banks, South Hamilton, Mass.

[73] Assignee: American Optical Corporation, Southbridge, Mass.

[21] Appl. No.: 108,423

[22] Filed: Dec. 31, 1979

[51] Int. Cl.³ .......................... G11B 5/56; G11B 21/24
[52] U.S. Cl. .................................................. 360/109
[58] Field of Search ............... 360/109, 105, 104, 129, 360/103, 76

[56] References Cited

U.S. PATENT DOCUMENTS

| | | | |
|---|---|---|---|
| 3,229,044 | 1/1966 | Kokke | 360/109 |
| 3,373,248 | 3/1968 | Baybick et al. | 360/109 |
| 3,678,210 | 7/1972 | Richards | 360/109 |
| 3,833,925 | 9/1974 | Jenkins | 360/105 |
| 3,882,543 | 5/1975 | Richards | 360/109 |
| 3,900,888 | 8/1975 | Uchikoshi et al. | 360/109 |
| 3,936,882 | 2/1976 | Lane | 360/104 |
| 4,052,745 | 10/1977 | Nakamichi | 360/109 |
| 4,086,638 | 4/1978 | Saito | 360/109 |
| 4,117,522 | 9/1978 | Whittle | 360/109 |

Primary Examiner—Alfred A. Eddleman
Attorney, Agent, or Firm—Jeremiah J. Duggan

[57] ABSTRACT

An adjustable tape head mounting mechanism includes a housing for engaging the tape, and comprises structure for supporting the head housing relative to a head carriage at at least three spaced positions on the housing for head adjustment.

10 Claims, 11 Drawing Figures

TAPE HEAD MOUNT

BACKGROUND OF THE INVENTION

The invention relates generally to magnetic tape carriage assemblies and more particularly to tape head mounting means therefor. More specifically still, the invention relates to improved adjustable tape head mounts.

The use of magnetic tape for recording and playback of data in electronic form is well known. In such recording and/or playback systems, a magnetic tape is caused to move relatively across the face of a transducer or tape head for the purpose of either receiving electrical signals from the tape head and storing them on the tape in magnetic form or, alternatively, for using the movement of such recorded magnetic signals past the tape head for inducing electrical signals in the tape head and its associated circuitry. Typically, the magnetic tape is stored on one reel and is collected on a motor-driven second reel. The normally stationary tape head includes one or more magnetic pole pieces in turn connected to appropriate input of output electrical circuitry. The relative motion of the tape past the tape head pole piece(s) causes magnetic interaction therebetween when data appears on either one, such that said data is transferred as well to the other.

To obtain good fidelity of the data stored or played back, considerable attention must be given to stabilizing the speed of the tape past the tape head and also to maintaining correct alignment and placement of the tape head pole pieces relative to the tape. These efforts may take on particular importance when the data being stored and/or played back is of a biomedical or physiological nature, as for instance the electrical waveform data obtained by monitoring a human heart as with the technique of ambulatory (Holter) cardiography. Specifically, electrodes are appropriately placed on an ambulatory patient and connected with a small lightweight, very slow-speed recorder which is worn by the patient for many hours, for instance one full day.

An example of the drive mechanisms associated with such a slow-speed recorder is described in U.S. Pat. No. 3,913,860 issued Oct. 21, 1975, for SLOW-SPEED TAPE RECORDER MECHANISM by Richards. That patent directs particular attention to the attainment of highly uniform tape speed. It will be appreciated, however, that the elevation and angular orientation of the tape relative to the tape head pole pieces as it is drawn therepast will affect the character of the signal transferred from one of the elements to the other. This becomes more evident when it is understood that the width of a pole piece is typically 0.020 inch and the width of a track of data stored on the tape is 0.020 inch and that the two must be aligned and maintained in register within 0.0005 inch. Unless the elevation and angular orientation of the tape head pole pieces relative to the tape is maintained within these limits throughout recording and playback, some distortion and thereby loss of the information will occur.

In order to minimize or eliminate such losses, efforts have been made initially to obtain and then to maintain the optimum orientation of the tape head pole pieces constant relative to the tape throughout a recording or a playback operation. Moreover, the tape head mounting mechanism has been provided with some degree of adjustability so that repeatability between the recorded signal and the signal played back may be obtained, as by a calibration operation at the initiation of the playback of the recorded signal. Such adjustment and calibration sometimes recognizes some form of standardized signal recorded on the tape to allow an operator to adjust the tape head mounting mechanism such that the reproduced signal substantially conforms with the recorded reference signal.

One example of such an adjustable tape head mounting mechanism is to be found in the Models 6002 and 6004 Holter Scanners marketed by American Optical Corporation. That tape head mounting mechanism provided a pair of opposed clamps for embracing and retaining the tape head. The lower one of the pair of clamps rested on an "M" shaped spring, and a pair of adjustable mounting screws extending through one of the clamps and into engagement with the head carriage served to adjustably urge the clamp and head assembly into compressive engagement with the spring. By selective adjustment of the screws, some control of the elevation and angular orientation of the tape head and its pole pieces relative to the tape was obtainable; however, the quality of adjustability and resulting stability of the tape head and its pole pieces were less than optimum for such physiological recording systems. For instance, the adjustment screws are in a single plane spaced well to the rear of the tape head's pole pieces, and only slight aberrations in the contact surface of an adjustment screw may act on the head clamp to produce, in addition to the attempted and desired adjustment, an unwanted displacement of the clamp and tape head. This unwanted displacement is small and has a given angular sign adjacent to the head of the screw but is magnified and can have the opposite sign at the pole pieces because of the leverage arm between the pole pieces and the screw head.

Accordingly, it is an object of the present invention to provide an improved adjustable tape head mounting mechanism.

It is another object of the invention to provide an improved adjustable tape head mounting mechanism which is relatively easy to adjust yet affords a high degree of accuracy and stability in its positioning, and thus the positioning of the pole pieces, relative to the tape.

SUMMARY OF THE INVENTION

According to the invention there is provided in a magnetic tape head carriage assembly including a head carriage frame, a tape head having a forward face containing pole pieces, and means on the head carriage for guiding the tape adjacent the pole pieces at the forward face of the tape head at a particular orientation relative to the head carriage, an improved mechanism for mounting and adjusting the tape head within the head carriage frame, relative to the tape. The tape head mounting mechanism includes a head housing for retaining the tape head, which head housing comprises a head-engaging portion for rigidly embracing the tape head, a first mounting portion and a beam portion extending between the first mounting portion and the head-engaging portion. The adjustable head mounting mechanism also includes structure for supporting the head housing relative to the head carriage at at least three spaced positions on the head housing, including first fastening means fixedly connecting the head housing to the head carriage at the head housing first mounting portion, and second and third support means in supportive engagement between the head carriage and the head housing and respectively spaced from each other and each spaced from the first fastening means by the beam portion. At least one of the second and third support means is selectively adjustable whereby motion of the head housing is constrained to that of the desired adjustment. The second and third support means are each independently adjustable threaded fasteners and extend through a pair of mounting holes in a head-engaging portion of the head housing on transversely opposite sides of the longitudinal midline of the beam portion, which is preferably a leaf spring, and into threaded engagement with the carriage frame. The beam portion of the head housing serves to space the adjustable screws sufficiently forward of the fulcrum formed at the fixed fastener such that small unwanted displacements at the adjustable screws are neither greatly amplified nor capable of changing the sign of the angular displacement at the pole pieces. Moreover, the beam lends torsional stability to the housing which results in angular stability of the pole pieces.

The head-engaging portion of the head housing is normally spaced from the head carriage and the second and third threaded fasteners adjustably deflect the head-engaging portion relatively toward or away from the head carriage. The longitudinal distance between the head housing first mounting portion and the pole pieces at the tape head forward face is sufficiently large that the displacement of the tape head forward face within the normal adjustment range is substantially planar and parallel to the magnetic tape.

The head housing enshrouds a major portion of the tape head and is formed of a high permeability material, such as Mumetal, for magnetically shielding the tape head.

DESCRITPION OF THE PREFERRED EMBODIMENTS

Figure 1:
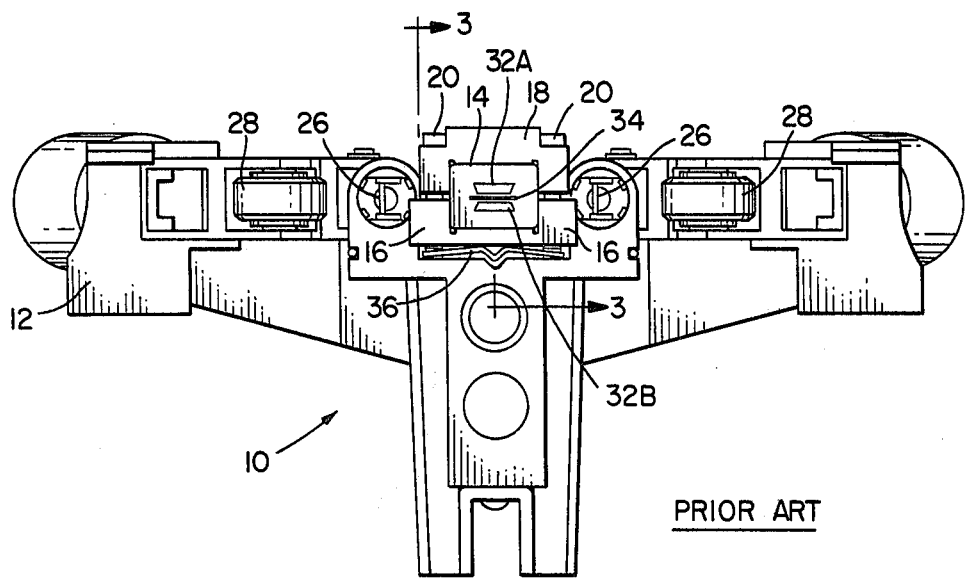
FIG. 1 is a front elevational view of a prior art magnetic tape carriage assembly.
Figure 2:
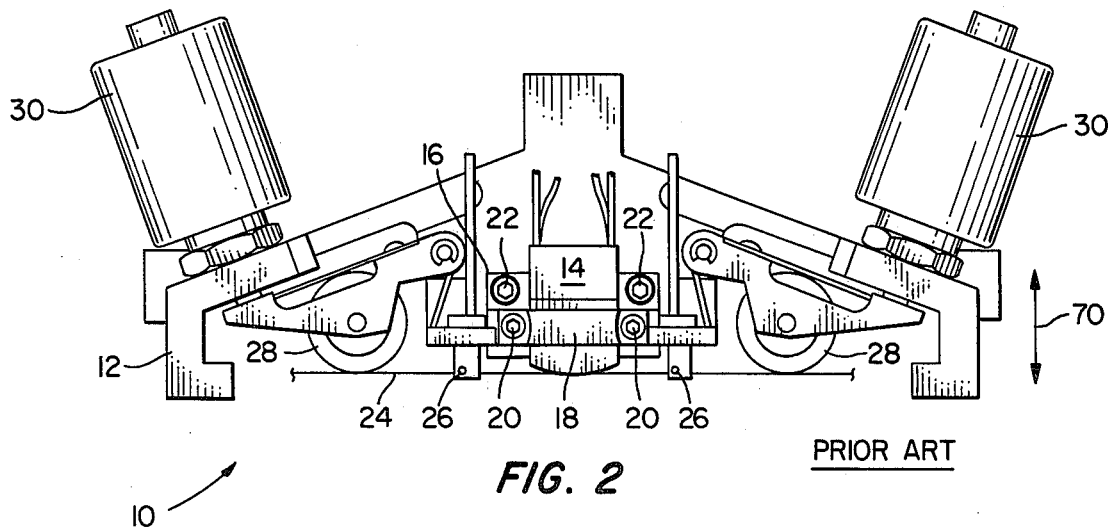
FIG. 2 is a top plan view of the tape carriage assembly of FIG. 1.
Figure 3:
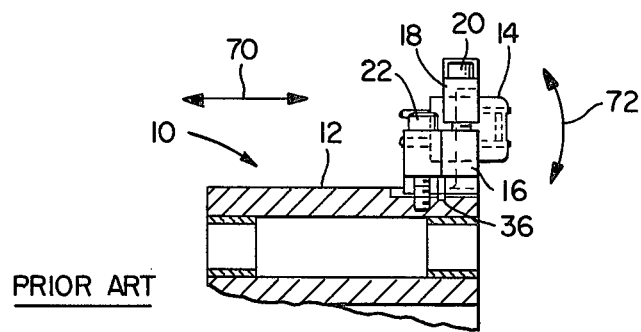
FIG. 3 is a sectional view of FIG. 1 taken along line 3—3 thereof.
Figure 4:
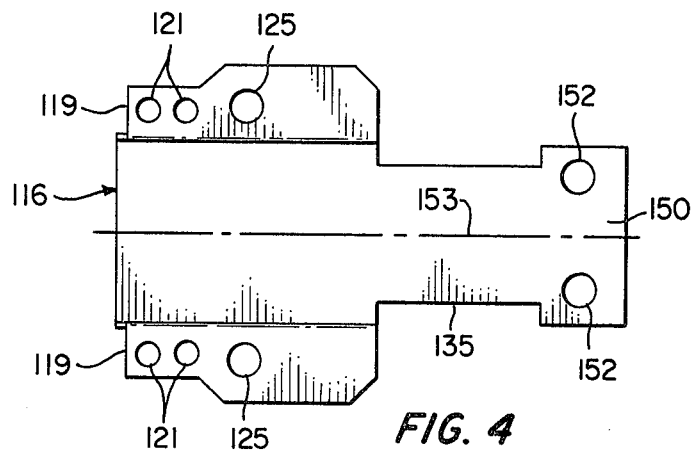
FIG. 4 is a top plan view of the bottom half of the tape head mount of the invention.
Figure 6:
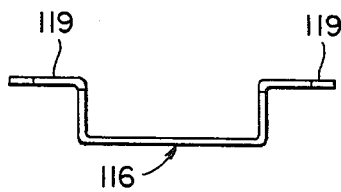
FIG. 6 is a front elevational view of the head mount of FIG. 4.
Figure 5:
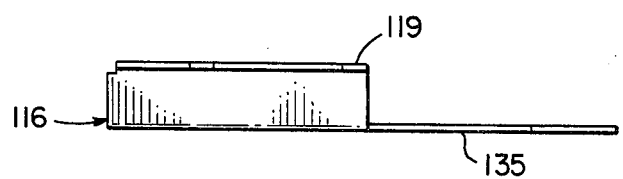
FIG. 5 is a side elevational view of the head mount of FIG. 4.
Figure 7:
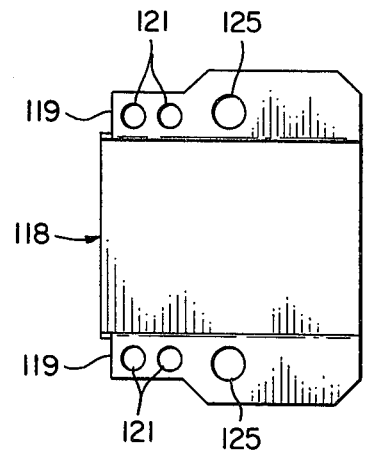
FIG. 7 is a top plan view of the top half of the tape head mount of the invention.
Figure 9:
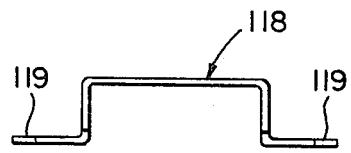
FIG. 9 is a front elevational view of the head mount of FIG. 7.
Figure 8:
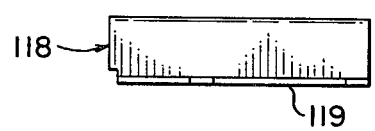
FIG. 8 is a side elevational view of the head mount of FIG. 7.

Referring to FIGS. 1-3, there is illustrated a magnetic tape head assembly in accordance with the aforementioned Models 6002, 6004 Holter Scanners marketed by American Optical Corporation. That magnetic tape head assembly, generally designated 10, includes a head carriage 12 on which a magnetic tape head 14 is adjustably mounted. Tape head 14 is retainedly embraced between the upwardly and downwardly opposed jaws of a pair of mounting clamps 16 and 18 respectively. A pair of clamping screws 20 respectively positioned on opposite sides of the tape head 14 serve to join the clamps 16, 18 in retaining engagement about the tape head 14. A pair of adjusting screws 22 positioned on opposite sides of the tape head 14 and extending through the lower clamp 16 rearwardly of the clamping screws 20 and into engagement with head carriage 12 provide some means for adjusting or controlling the elevation and angular orientation of the tape head 14 and its pole pieces relative to a magnetic tape 24 drawn across the forward face of the tape head.

In the illustrated prior art embodiment of FIG. 1, the forward face of tape head 14 includes a pair of vertically spaced horizontally elongated pole pieces 32A and 32B respectively, which are separated by a thin shield 34. This provides two-track operation.

Specifically, a pair of tape guides 26 mounted on head carriage 12 are positioned on respectively opposite sides of the tape head 14 and serve to closely define and guide the path of the tape 24 as it passes adjacent the pole pieces 32A, 32B at the forward face of tape head 14. A pair of pinch rollers 28 respectively outboard of the tape guides 26 are actuated by respective solenoids 30 via a connecting mechanism to engage or disengage the tape 24 with respective drive capstans, not shown, in a known manner. The drive capstans are part of a tape deck, not shown, on which the head carriage 12 is slidably mounted in a known manner. The head carriage 12 is, as indicated by arrow 70 in FIGS. 2 and 3, selectively slidable between and locked at a "forward" position in which the tape head pole pieces 32A, 32B are in juxtaposition with tape 24 (FIG. 2) and a "retracted" position in which the tape head 14 and its pole pieces are withdrawn from the tape. The head carriage 12 is otherwise stationary relative to the tape deck and thus the elevational and angular adjustability of tape head 14 relative to head carriage 12 is the same relative to the tape deck (not shown).

An "M" shaped leaf spring 36 is interposed between an upper surface of head carriage 12 and the lower surface of lowermost tape head clamp 16 such that that clamp, and accordingly the upper clamp 18 and tape head 14, are upwardly baised against the downwardly directd constraining surfaces of the heads of adjusting screws 22. The pair of adjusting screws 22 are responsible for determining and maintaining the position of the tape head 14 via control of the tape head mounting clamps 16, 18. Some control of tape head elevation and angular orientation relative to the tape 24 is afforded by selective adjustment of the adjusting screws 22 individually or in unison. However, because the pole pieces 32A, 32B at the forward face of tape head 14 are positioned well forward of the fulcrum defined by the axes of screws 22, small unwanted aberrations in the positioning of clamps 16 and 18 may be greatly amplified at the pole pieces, as illustrated by arrow 72 in FIG. 3, if those aberrations are relatively near the axes of screws 22. Such aberrations may arise, for instance, due to a non-horizontal undersurface of the heads of screws 22, in which case a small rotation of the screw can not only greatly change the angle, but even the sign of the angle of the tape head relative to the horizontal.

Figure 10:
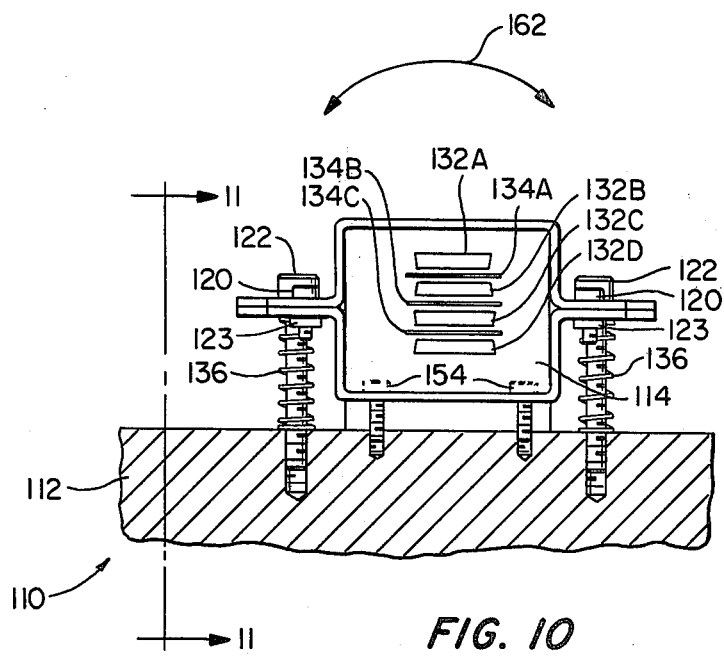
FIG. 10 is a front elevational assembly view of the adjustable head mounting mechanism of the invention.
Figure 11:
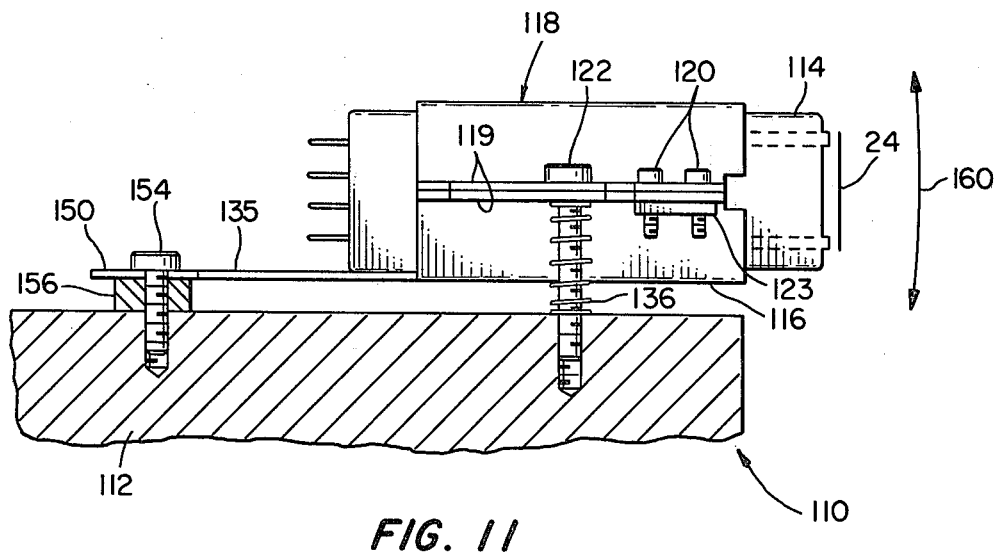
FIG. 11 is a side elevational view of the assembly of FIG. 10 taken along line 11—11 thereof.

Referring to FIGS. 4-11, there is illustrated an adjustable tape head mounting mechanism constructed in accordance with and satisfying the objects of the invention. Many portions of the tape head assembly 110 of the invention are similar to those of the head assembly 10 of the prior art and have been omitted from the following views. Instead only those portions of the assembly directly concerned with the invention and generally differing from the prior art have been illustrated. Referring briefly to FIGS. 10 and 11, the magnetic tape head 114 is substantially identical to tape head 14 except that it is here illustrated as comprising four vertically spaced magnetic pole pieces 132A, 132B, 132C and 132D respectively spaced by shields 134A, 134B and 134C. This affords four-track operation and makes the need for a head mounting mechanism which is stable and accurately adjustable all the more critical.

The tape head 114 is adjustably mounted on head carriage 112 by means of a novel head housing and supporting arrangement. The housing for tape head 114 comprises an upwardly-facing lower mounting clamp 116 and a downwardly-facing upper mounting clamp 118. The clamps 116, 118 comprise substantially identical channel members which extend fore and aft along and over the sides of the tape head 114, and each includes horizontally extending flanges or shoulders 119 on opposite sides thereof. Each of the flanges 119 on the channel members 116, 118 includes a pair of holes 121 through which pass a respective pair of clamping screws 120 for threaded engagement with respective double-tapped nuts 123. When clamping screws 120 are threaded securely into their respective nuts 123, the opposed clamps 116, 118 of the tape head mount are drawn into rigid embracing, shielding and retaining engagement with tape head 114.

In accordance with the invention, the head housing includes, in addition to the head-engaging clamps 116, 118, a beam portion, here a leaf spring 135, extending rearwardly from the lower head-engaging clamp 116 to a rear or base mounting portion 150. At least one, and as illustrated herein preferably two, mounting screw holes 152 extend through the rear mounting portion 150. Mounting screw holes 152 are equidistantly spaced on transversely opposite sides of the longitudinal midline 153 of the leaf spring 135. The leaf spring midline 153 also comprises the midline for the channeled clamping portion 116 as well.

The lower mounting clamp 116 via its leaf spring portion 135 is mounted in cantilever fashion by means of a pair of mounting screws 154 extending through respective mounting holes 152 in base portion 150 and into snug threaded engagement with respective tapped holes in the head carriage 112. Preferably the fulcrum for the lower mounting clamp 116 and its spring portion 135 is positioned only slighlty forward of the mounting screws 154. This may be accomplished either by relieving the region of the head carriage beneath the lower mounting clamp 116 beginning just forwardly of the mounting screws 154 or, as illustrated herein, a mounting pedestal 156 may be inserted beneath the upper surface of the head carriage 112 and the undersurface of the rear mounting portion 150 of the lower mounting clamp 116. The leading edge of pedestal 156 is only a small distance forward of the mounting screws 154 and forms the fulcrum for the leaf spring portion 135. With mounting screws 154 secured tightly in head carriage 112, the leaf spring 135 and upper and lower clamps 116, 118 extend substantially horizontally, thus orienting tape head 114 similarly.

An adjusting screw hole 125 extends through each of the shoulder flanges 119 of the mounting clamps 116, 118 and is positioned such that a pair of adjusting screws 122 may be passed through the flanges 119 on opposite sides of the tape head 114 for adjustable threaded engagement with tapped holes in head carriage 112. Holes 125 are sized to provide a clearance fit for the adjusting screws 122 extending therethrough and each screw may be individually adjusted so as to control the elevation and angular orientation of tape head 114. Two coil springs 136 are each concentrically disposed about the respective adjusting screws 122 in compression between head carriage 112 and the underside of flange 119 of lower clamp 116. The springs 136 apply a significant upwardly-directed bias to clamps 116, 118, such that by increasing or decreasing the threaded engagement of screws 122 with head carriage 112, the clamps and thus tape head 114 are moved respectively downward or upward relative to head carriage 112 and tape 24, as illustrated by arrow 160 in FIG. 11. The coil springs 136 also serve to frictionally engage the heads of screws 122 with clamp 118 so as to prevent inadvertent rotation of the screws. Leaf spring 135 serves, to a lesser extent than springs 136, to also bias clamps 116, 118, its bias being principally toward a horizontal orientation of the clamps and tape head.

In the illustrated embodiment, the thickness of the beam portion, leaf spring 135, is about 0.014 inch, its width is about 0.375 inch, and the distance from the fulcrum edge of pedestal 156 to the rear end of the clamp channel 116 is about 0.6 inch and to the center of adjusting screw holes 125 is about 0.9 inch. Moreover, the distance from the fulcrum edge of pedestal 156 to the forward face of tape head 114 may be about 1.5–1.75 inch. Because screws 122 are more than one-half the distance from the fulcrum edge of pedestal 156 to the forward face of head 114, small aberrations in the displacement of clamps 116, 118 at screws 122 are not substantially amplified at the forward face of the tape head. Further, due to the relatively long moment arm from pedestal 156 to the forward face of head 114, the adjustably controlled vertical displacement of the forward face of tape head 114 is substantially planar, that motion being indicated by arrows 160. That substantially planar vertical motion of tape head 114 is substantially parallel to the plane of magnetic tape 24 so as to substantially eliminate variations in spacing between the tape head and tape 24 within the range of vertical adjustability of the tape head. The angular orientation of tape head 114 relative to tape 24 is controlled by selective adjustment of one adjusting screw 122 relative to the other and is represented by the arcuately directed arrows 162 in FIG. 10. In this regard, the beam portion formed by leaf spring 135 additionally contributes torsional stability to the housing and tape head 114.

This present arrangement whereby the tape head 114 is retained within a housing structure which in turn is supported at the end of a cantilevered beam or leaf spring 135 provides support for the system at at least the three support locations defined by the two adjusting screws 122 and the one or more base mounting screws 154. Such arrangement is particularly stable and utilizes the relatively long moment arm afforded by the cantilevered beam to afford substantially planar displacement of tape head 114 within its range of vertical adjustment and to minimize the effects of any unwanted aberrations or displacements occurring at the adjusting screws. The integral beam, formed by leaf spring 135, additionally affords good resilient torsional stability to the angular orientation to which the tape head 114 may be adjustably set.

Both the upper mounting clamp 118 and the lower mounting clamp 116 with appended leaf spring 135 are preferably formed of a high permeability material, such as Mumetal, to provide magnetic shielding for the tape head 114. This is particularly advantageous in minimizing electromagnetic interference in the tape head if the tape head must be located relatively close to the electric drive motors present in recorders and playback units.

The thickness of the Mumetal housing, including leaf spring 135, is relatively thin (0.014 inch) such that it may be easily formed. However, if Mumetal or other material of thicker gauge is used to form the housing, and particularly the beam or leaf spring 135, it will be appreciated that the spring rates of coil springs 136 might be changed or eliminated entirely.

The invention may be embodied in other specific forms without departing from the spirit or essential characteristics thereof. For instance, the adjusting screws might be replaced by studs and nuts such that only the nuts are rotated to control the orientation of the tape head and its pole pieces. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a magnetic tape head assembly including a head carriage, a tape head having a forward face containing pole piece means, means for adjustably mounting the tape head on the head carriage and means on said head carriage for guiding the tape adjacent the pole piece means at the forward face of the tape head at a particular orientation relative to the head carriage, the improvement wherein said adjustable head mounting means comprises:

head housing means for retaining said tape head, said head housing means comprising an engaging portion for rigidly embracing said tape head, a first mounting portion and a beam portion extending between said first mounting portion and said head-engaging portion, a pair of mounting holes therethrough on transversely opposite sides of a longitudinal midline of said beam portion, and second and third mounting portions each spaced from said first mounting portion by said beam portion and respectively positioned on transversely opposite sides of the longitudinal midline of said beam portion;

biasing means for urging said head housing means relatively upward away from said head carriage; and means for supporting said head housing means relative to said head carriage at at least three spaced positions on said head housing means, said supporting means comprising first fastening means fixedly connecting said head housing means to said head carriage at said head housing means first mounting portion, and second and third support means in supportive engagement between said head carriage and said head housing means and respectively spaced from each other and each spaced from said first fastening means by said beam portion, said second and third support means being independently adjustable, whereby motion of said head housing means is constrained to that of the desired adjustment and said second and third support means having respective threaded fastening means each passing clearly through a respective one of said pair of mounting holes and into connecting engagement with said head carriage, each said threaded fastening means including a shoulder portion engaging and acting to displace said head-engaging portion in response to rotation of at least a portion of said fastening means relative to said head carriage and said head-holding means.

2. The tape head assembly of claim 1 wherein said biasing means comprises two coil springs each concentrically disposed about a respective one of the threaded fastening means comprising said second and third support means, said coil springs being in compression between said head carriage and said head housing.

3. The tape head assembly of claim 2 wherein the longitudinal distance from said first mounting portion to said second and third mounting portions respectively of said head housing means is at least about one-half the longitudinal distance from said first mounting portion to said tape head forward face such that deflections of said tape head forward face caused by displacement aberrations at either of said second and third mounting portions are limited.

4. The tape head assembly of claim 2 wherein the longitudinal distance from said first mounting portion to said second and third mounting portions respectively of said head housing means is at least about one-half the longitudinal distance from said first mounting portion to said tape head forward face such that deflections of said tape head forward face caused by displacement aberrations at either of said second and third mounting portions are limited.

5. The tape head assembly of claim 1 wherein the longitudinal distance from said head housing means first mounting portion to said tape head forward face is sufficiently large that displacement of said tape head forward face within the adjustment range of said second and third support means is substantially planar and parallel to the magnetic tape.

6. The tape head assembly of claim 4 wherein the longitudinal distance from said head housing means first mounting portion to said tape head forward face is sufficiently large that displacement of said tape head forward face within the adjustment range of said second and third support means is substantially planar and parallel to the magnetic tape.

7. The tape head assembly of claim 6 wherein said head housing means beam portion comprises a leaf spring.

8. The tape head assembly of claim 7 wherein said head-engaging portion of said head housing means comprises a pair of opposed flanged channel members rigidly connected to one another and securely retaining the tape head therebetween, said leaf spring integrally extending from one of said channel members.

9. The tape head assembly of claim 6 wherein at least said head-engaging portion of said head housing means enshrouds a major portion of said tape head, and at least said tape head and shrouding portion comprises a high permeability material for magnetic shielding.

10. The tape head assembly of claim 1 wherein said second and third mounting portions are positioned intermediate said first mounting portion and said tape head forward face such that displacements to said head housing at said second and third mounting portions result in displacements of only the same sign being transmitted to said tape head forward face.

* * * * *